(12) United States Patent  
Graves

(10) Patent No.: US 8,661,925 B2  
(45) Date of Patent: Mar. 4, 2014

(54) HYDRAULICALLY OPERATED SHIFTER FOR POWER TAKE-OFF

(75) Inventor: Damon B. Graves, Memphis, TN (US)

(73) Assignee: Parker Hannifin Corporation, Cleveland, OH (US)

(*) Notice: Subject to any disclaimer, the term of this patent is extended or adjusted under 35 U.S.C. 154(b) by 1205 days.

(21) Appl. No.: 12/112,364

(22) Filed: Apr. 30, 2008

(65) Prior Publication Data

US 2008/0264188 A1    Oct. 30, 2008

Related U.S. Application Data

(60) Provisional application No. 60/926,886, filed on Apr. 30, 2007.

(51) Int. Cl.
*F16H 61/30* (2006.01)

(52) U.S. Cl.
USPC ............................. 74/15.4; 74/346

(58) Field of Classification Search
USPC ......... 74/15.4, 15.6, 15.66, 346, 364; 91/234; 92/181 R, 181 P; 192/85.27, 85.59; 475/116, 131, 133, 138, 139
See application file for complete search history.

(56) References Cited

U.S. PATENT DOCUMENTS

| | | | | |
|---|---|---|---|---|
| 1,037,021 A | * | 8/1912 | Kiesel | 251/51 |
| 1,233,088 A | * | 7/1917 | Maegly | 74/334 |
| 1,602,209 A | * | 10/1926 | Proell | 137/494 |
| 2,079,684 A | | 5/1937 | Church | |
| 2,624,207 A | * | 1/1953 | Forman | 477/105 |
| 2,943,719 A | | 7/1960 | McNamara et al. | |
| 3,648,546 A | * | 3/1972 | McNamara et al. | 74/745 |
| 3,742,777 A | | 7/1973 | Mathauser | |
| 3,982,443 A | | 9/1976 | Fitch | |
| 4,218,934 A | | 8/1980 | Demorest et al. | |
| 4,275,607 A | | 6/1981 | Snoy | |
| 4,287,778 A | | 9/1981 | Quick | |
| 4,396,102 A | | 8/1983 | Beach | |
| 4,431,073 A | | 2/1984 | Nagao et al. | |
| 4,455,883 A | | 6/1984 | Radcliffe | |

(Continued)

FOREIGN PATENT DOCUMENTS

EP    1 757 834    2/2007
EP    1 172 246    3/2007

(Continued)

OTHER PUBLICATIONS

European Search Report, Application No. EP 08767458 dated Jul. 2, 2010.

*Primary Examiner* — Thomas Diaz
(74) *Attorney, Agent, or Firm* — MacMillan, Sobanski & Todd, LLC

(57) ABSTRACT

A hydraulically operated shifter for use in a power take-off includes a shifter housing having an interior, a fluid port, and an opening. A shifter piston is disposed within the interior of the shifter housing and is movable in first and second directions. The shifter piston defines first and second chambers within the interior of the shifter housing. The fluid port communicates with the first chamber, and the opening communicates with the second chamber. The shifter piston includes a passageway that provides communication between the first and second chamber defined within the interior of the shifter housing. A shift actuator is supported on the shifter piston for movement therewith and extends through the opening provided in the shifter housing.

19 Claims, 5 Drawing Sheets

(56) References Cited

U.S. PATENT DOCUMENTS

| | | | |
|---|---|---|---|
| 4,466,279 A | 8/1984 | Gable et al. | |
| 4,541,510 A * | 9/1985 | Itoh et al. | 184/6.12 |
| 4,549,449 A | 10/1985 | Miller et al. | |
| 4,594,906 A | 6/1986 | Vincent et al. | |
| 4,700,820 A * | 10/1987 | Hickmann et al. | 192/48.5 |
| 4,715,012 A | 12/1987 | Mueller, Jr. | |
| 4,727,759 A | 3/1988 | Yamaoka et al. | |
| 5,046,592 A * | 9/1991 | Mainquist et al. | 192/3.58 |
| 5,311,787 A | 5/1994 | Wilson et al. | |
| 5,341,723 A * | 8/1994 | Hung | 91/224 |
| RE34,833 E | 1/1995 | Hasegawa et al. | |
| 5,522,213 A | 6/1996 | Bustamante | |
| 5,669,479 A | 9/1997 | Matsufuji | |
| 6,364,280 B1 | 4/2002 | Stach | |
| 6,401,848 B1 | 6/2002 | Vu | |
| 6,854,541 B2 | 2/2005 | Matufuji et al. | |
| 7,207,409 B2 | 4/2007 | Downs | |
| 7,273,126 B2 | 9/2007 | Inoue et al. | |
| 2006/0101932 A1 | 5/2006 | McCrary | |

FOREIGN PATENT DOCUMENTS

| | | |
|---|---|---|
| JP | 55-106825 | 8/1980 |
| JP | 57-060912 | 4/1982 |
| JP | 2-099425 | 4/1990 |
| JP | 2005-090664 | 4/2005 |
| WO | WO84/00408 | 2/1984 |
| WO | WO98/17926 | 4/1998 |

* cited by examiner

HYDRAULICALLY OPERATED SHIFTER FOR POWER TAKE-OFF

CROSS-REFERENCE TO RELATED APPLICATIONS

This application claims the benefit of U.S. Provisional Application No. 60/926,886, filed Apr. 30, 2007, the disclosure of which is incorporated herein by reference.

BACKGROUND OF THE INVENTION

This invention relates in general to shifting mechanisms for power take-offs. In particular, this invention relates to an improved structure for a hydraulically operated shifter for use in such a power take-off.

Power take-offs are well known mechanical devices that are commonly used in conjunction with sources of rotational energy, such as engines and transmissions contained in vehicles, for selectively providing power to one or more rotatably driven accessories. For example, power take-offs are commonly used in a variety of industrial and agricultural vehicles for operating hydraulic pumps that, in turn, operate hydraulically driven accessories, such as plows, trash compactors, lifting mechanisms, winches, and the like. The power take-off provides a relatively simple and inexpensive mechanism for supplying rotational power from the source of rotational energy to operate the rotatably driven accessory.

A typical power take-off includes a hollow housing having a mounting surface provided thereon. An opening is formed through the mounting surface of the power take-off housing. An input gear is rotatably supported within the power take-off housing and includes a portion that extends outwardly through the opening formed through the mounting surface. The mounting surface of the power take-off housing is adapted to be secured (typically by a plurality of bolts) to a corresponding mounting surface provided on a case of the source of rotational power, such as a vehicle transmission or engine. The mounting surface provided on the transmission case also has an opening formed therethrough. When the power take-off housing is secured to the transmission case, the opening formed through the mounting surface of the power take-off housing is aligned with the opening formed through the transmission case. This allows the input gear of the power take-off to extend through such aligned openings into meshing engagement with one of the gears contained within the transmission. Typically, the input gear of the power take-off meshes with a transmission gear that is constantly driven by the vehicle engine. As a result, the input gear of the power take-off is rotatably driven by the transmission gear whenever the vehicle engine is operated.

The power take-off further includes an output shaft that is rotatably supported within the power take-off housing. A portion of the output shaft extends outwardly from the power take-off housing and is adapted to be connected to the rotatably driven accessory. In some power take-offs, the output shaft is constantly connected for rotation by the input gear. In those instances, the output shaft rotatably drives the rotatably driven accessory whenever the input gear is rotatably driven by the transmission gear. In other power take-offs, however, the output shaft is only intermittently connected for rotation by the input gear by means of an intermediate clutch. When the clutch connects the output shaft for rotation by the input gear, the output shaft rotatably drives the rotatably driven accessory whenever the input gear is rotatably driven by the transmission gear. When the clutch disconnects the output shaft from rotation by the input gear, the output shaft does not rotatably drive the rotatably driven accessory.

This engagement and disengagement of the clutch is controlled by a shifter that is typically provided on the housing of the power take-off. A typical shifter includes a hydraulic or pneumatic piston and cylinder assembly that is connected to a movable shift fork. Frequently, the shift fork is connected to the piston such that movement of the piston within the cylinder causes movement of the shift fork. When the piston and cylinder assembly is operated in a first mode, the piston and the shift fork are moved in a first direction. This movement in the first direction causes the clutch to become disengaged, thereby disconnecting the output shaft from rotation by the input gear and preventing operation of the rotatably driven accessory. When the piston and cylinder assembly is operated in a second mode, the piston and the shift fork are moved in a second direction. This movement in the second direction causes the clutch to become engaged, thereby connecting the output shaft for rotation by the input gear and causing operation of the rotatably driven accessory.

A biasing mechanism, such as a spring, may be provided within the shifter to urge the piston and the shift fork for movement in the first direction. When so provided, the biasing mechanism normally maintains the clutch of the power take-off in a first operating condition (either engaged or disengaged as desired). To operate the clutch in a second operating condition (either disengaged or engaged, respectively), pressurized fluid is supplied within the piston and cylinder assembly. This pressurized fluid urges the piston and the shift fork for movement in the second direction against the urging of the biasing mechanism. By controlling the application of this pressurized fluid, the clutch of the power take-off can be operated as desired.

In order to control the application of this pressurized fluid in this manner, a fluid control valve is usually provided. Typically, the fluid control valve is embodied as a solenoid valve that includes an inlet port, an outlet port, and an exhaust port. The inlet port of the control valve communicates with a source of pressurized fluid, such as a pump or a compressor that may be provided on or within the transmission. The outlet port of the control valve communicates with the piston and cylinder assembly. The exhaust port of the control valve communicates with a reservoir of the fluid, such as may be provided on or within the transmission. When the control valve is actuated in a first operating condition, fluid communication is prevented between the inlet port and the outlet port, while fluid communication permitted is between the exhaust port and the outlet port. As a result, pressurized fluid is not supplied within the piston and cylinder assembly, and the piston and cylinder assembly is vented to the reservoir of the fluid. Consequently, the clutch of the power take-off is operated in the first operating condition described above. When the control valve is actuated in a second operating condition, fluid communication is permitted between the inlet port and the outlet port, while fluid communication is prevented between the exhaust port and the outlet port. As a result, pressurized fluid is supplied within the piston and cylinder assembly, and the piston and cylinder assembly is not vented to the reservoir of the fluid. Consequently, the clutch of the power take-off is operated in the second operating condition described above.

When the shifter is operated pneumatically (i.e., by means of a gaseous medium, such as air), the exhaust port of the control valve can be simply vented to the atmosphere, which essentially functions as the reservoir of the fluid. However, when the shifter is operated hydraulically (i.e., by means of a liquid medium, such as oil), a liquid return line is provided between the exhaust port of the control valve and the reservoir of the fluid, which is usually located within the power take-off or the transmission. Although the use of such a liquid return line has functioned satisfactorily, it has been found that the need for providing such a liquid return line from the exhaust port of the control valve and the reservoir of the fluid increases the complexity and cost of the shifter. Thus, it would be desirable to provide an improved structure for a hydraulically operated shifter for use in a power take-off that is simpler and less expensive in construction than known structures.

SUMMARY OF THE INVENTION

This invention relates to an improved structure for a hydraulically operated shifter for use in a power take-off that is relatively simple and inexpensive in construction. The shifter includes a shifter housing having an interior, a fluid port, and an opening. A shifter piston is disposed within the interior of the shifter housing and is movable in first and second directions. The shifter piston defines first and second chambers within the interior of the shifter housing. The fluid port communicates with the first chamber, and the opening communicates with the second chamber. The shifter piston includes a passageway that provides communication between the first and second chamber defined within the interior of the shifter housing. A shift actuator is supported on the shifter piston for movement therewith and extends through the opening provided in the shifter housing.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
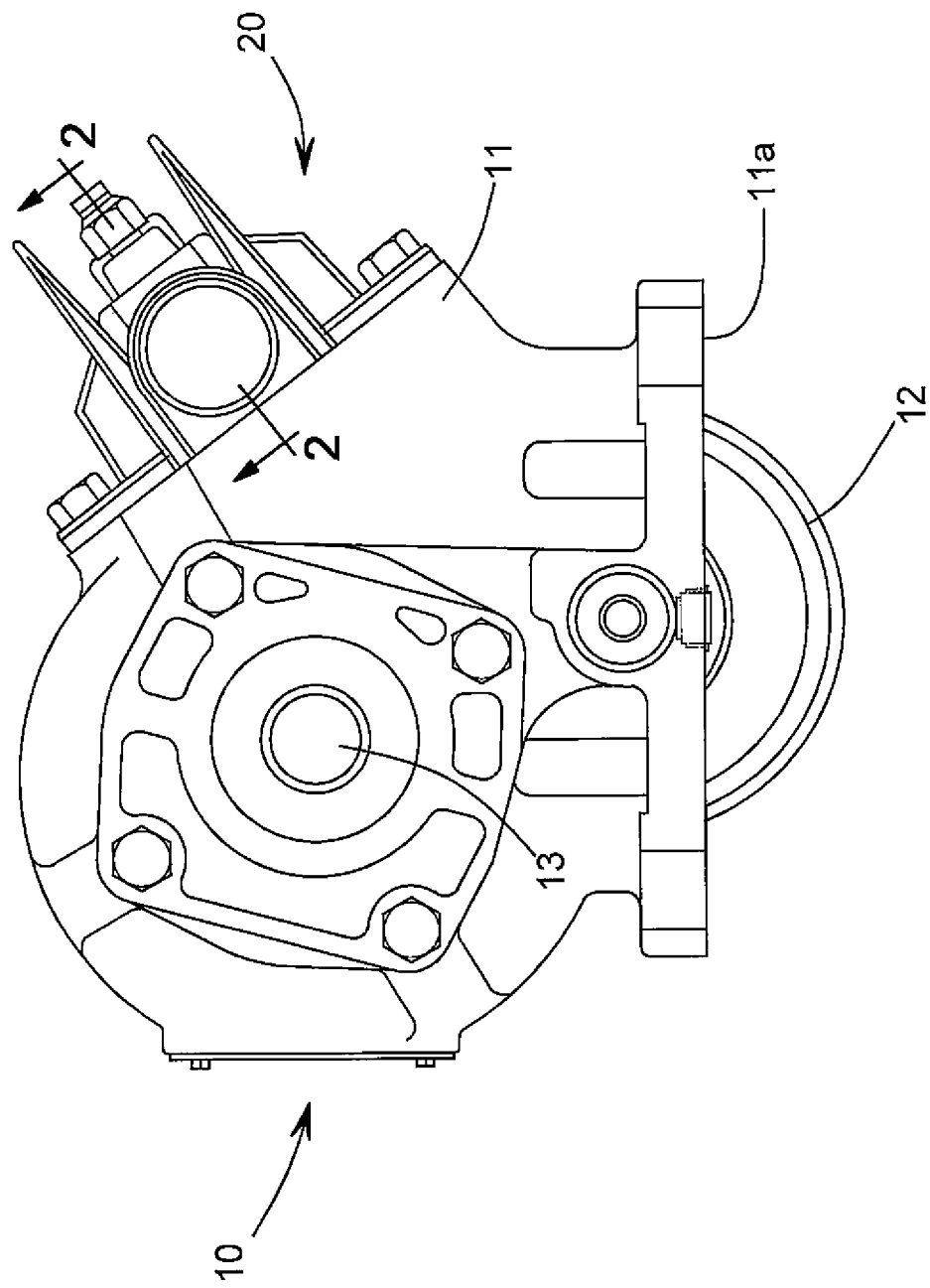
FIG. 1 is an elevational view of a first embodiment of a power take-off including a hydraulically operated shifter in accordance with the invention.

Referring now to the drawings, there is illustrated in FIG. 1 a power take-off, indicated generally at 10, in accordance with this invention. The illustrated power take-off 10 is, in large measure, conventional in the art and is intended merely to illustrate one environment in which this invention may be used. Thus, the scope of this invention is not intended to be limited for use with the specific structure for the power take-off 10 illustrated in the drawings or with power take-offs in general. On the contrary, as will become apparent below, this invention may be used in any desired environment for the purposes described below.

The illustrated power take-off 10 includes a hollow housing 11 having a mounting surface 11a provided thereon. An opening 11b (see FIG. 2) is formed through the mounting surface 11a of the power take-off housing 11. An input gear 12 is rotatably supported within the power take-off housing 11 and includes a portion that extends outwardly through the opening 11b formed through the mounting surface 11a. The mounting surface 11a of the power take-off housing 11 is adapted to be secured (typically by a plurality of bolts) to a corresponding mounting surface (not shown) provided on a source of rotational power so as to be rotatably driven in the manner described above. The power take-off 10 also includes an output shaft 13 that is rotatably supported within the power take-off housing 11. A portion of the output shaft 13 extends outwardly from the power take-off housing 11 and is adapted to be connected to a rotatably driven accessory (not shown) in a conventional manner, as also described above.

Figure 3:
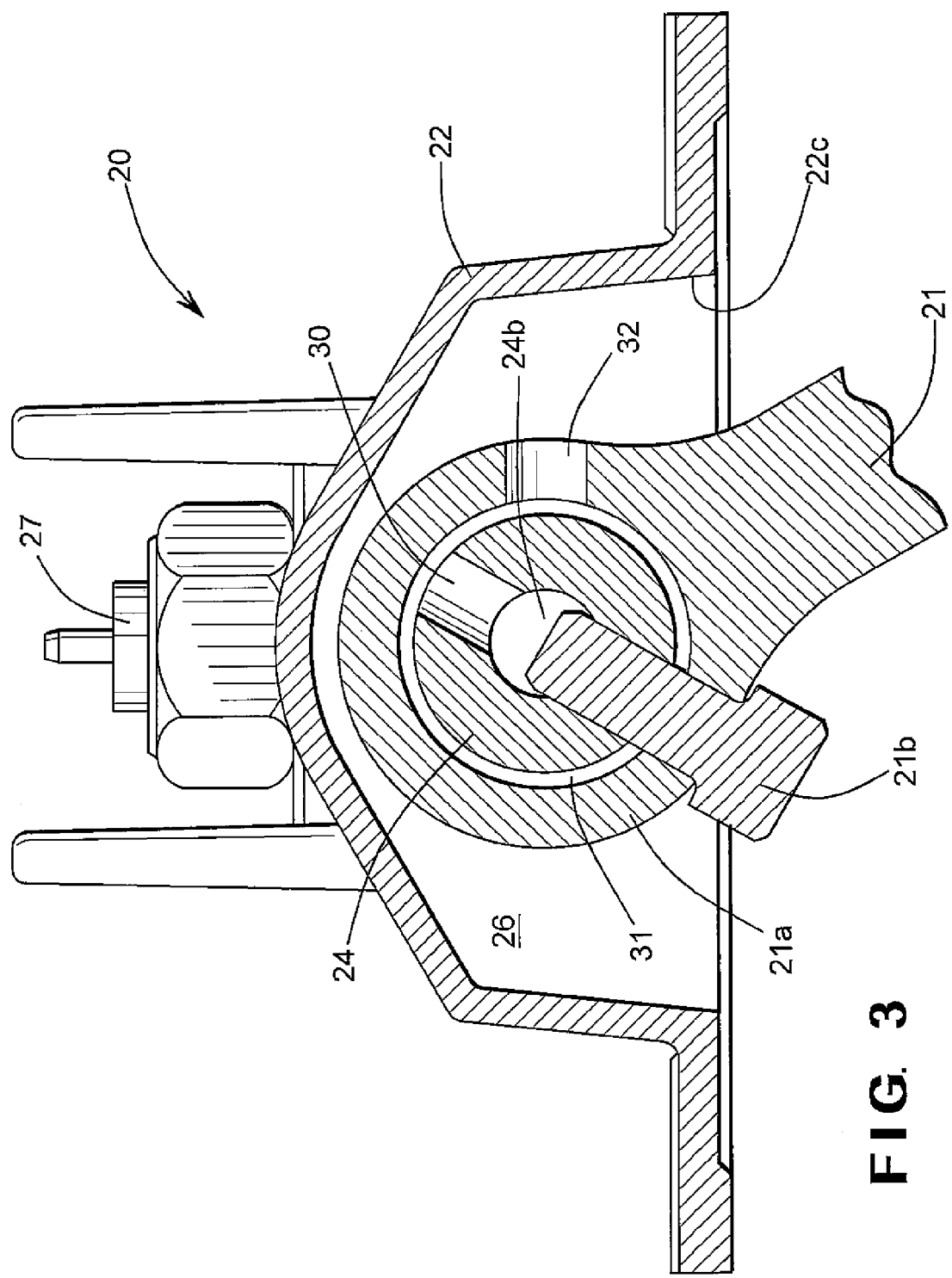
FIG. 3 is a further enlarged sectional elevational view of the first embodiment of the hydraulically operated shifter taken along line 3-3 of FIG. 2.

A clutch (see FIG. 3) is provided for selectively connecting the output shaft 13 for rotation by the input gear 12 and, as a result, for causing operation of the rotatably driven accessory. The clutch is conventional in the art and may be embodied as any of a variety of well known structures. For example, the clutch may be embodied as a gear that is splined onto a splined portion of the output shaft 13 for movement between an engaged position, wherein the clutch gear meshes with the input gear 11, and a disengaged position, wherein the clutch gear does not mesh with the input gear 11. Alternatively, the clutch may be embodied as a friction plate or similar clutch assembly that is operable in an engaged mode, wherein the output shaft 13 is connected for rotation by the input gear 12, and a disengaged mode, wherein the output shaft 13 is not connected for rotation by the input gear 12. Regardless of its specific structure, the clutch is provided within the power take-off housing 11 for permitting selective or intermittent operation of the rotatably driven accessory whenever the input gear 12 of the power take-off 10 is rotated.

The clutch is operated by means of a hydraulically operated shifter, indicated generally at 20. The structure of the shifter 20 is illustrated in detail in FIGS. 2 and 3. As shown therein, the shifter 20 includes an axially movable shift fork 21 or other shift actuator. When the shift fork 21 is moved in a first direction (such as, for example, toward the right in FIG. 2), the clutch is disengaged such that the output shaft 13 is not connected for rotation by the input gear 12 and, therefore, operation of the rotatably driven accessory is prevented. When the shift fork 21 is moved in a second direction (such as, for example, toward the left in FIG. 2), the clutch is engaged such that the output shaft 13 is connected for rotation by the input gear 12 and, therefore, operation of the rotatably driven accessory is permitted.

The shifter 20 further includes a shifter housing 22 that, in the illustrated embodiment, is generally hollow and cylindrical in shape. The illustrated shifter housing 22 is mounted on the power take-off housing 11 and includes a fluid port 23 that communicates with the interior of the shifter housing 22. The opposed ends of the shifter housing 22 may be sealed by first and second plugs 22a and 22b. Alternatively, the opposed ends of the shifter housing 22 may be sealed by integrally cast end portions (not shown). An opening 22c is formed through a portion of the shifter housing 22 and is aligned with the opening 11b formed through the housing 11 of the power take-off 10. The shift fork 21 extends through the opening 22c formed through the shifter housing 22 and through the opening 11b formed through the power take-off housing 11 into engagement with the clutch provided within the power take-off housing 11.

A shifter piston 24 is disposed within the shifter housing 22 for sliding movement in the first and second directions mentioned above. A portion of the shifter piston 24 (near the right end when viewing FIG. 2) seals against a portion of the inner surface of the shifter housing 22 so as to divide the interior of the shifter housing 22 into a first chamber 25 and a second chamber 26. The fluid port 23 provided through the shifter housing 22 communicates with the first chamber 25. The second chamber 26 communicates through the opening 22c formed through the shifter housing 22 and through the opening 11b formed through the power take-off housing 11 with the interior of the power take-off housing 11. If desired, a sensor 27 or other device may be mounted on the shifter housing 22 to monitor one or more characteristics of the operation of the shifter 20, such as, for example, the position of the shifter piston 24 relative to the shifter housing 22. The sensor 27 is conventional in the art and forms no part of this invention.

The shift fork 21 is supported on the shifter piston 24 for movement therewith in both the first and second directions. To accomplish this, the illustrated shift fork 21 includes an annular portion 21a that extends about a portion of the outer surface of the shifter piston 24. The shift fork 21 may be secured for concurrent movement with the shifter piston 24 by means of a threaded fastener 21b or any other conventional means. Thus, when the shifter piston 24 and the shift fork 21 are moved in the first direction (toward the right in FIG. 2), the clutch is disengaged such that the output shaft 13 is not connected for rotation by the input gear 12 and, therefore, operation of the rotatably driven accessory is prevented. When the shifter piston 24 and the shift fork 21 are moved in the second direction, the clutch is engaged such that the output shaft 13 is connected for rotation by the input gear 12 and, therefore, operation of the rotatably driven accessory is permitted.

The illustrated shifter piston 24 has a counterbore 24a provided therein that receives a first end of a biasing member 28. In the illustrated embodiment, the biasing member 28 is a coil spring, although any other resilient or force-generating structure may be provided. A second end of the biasing member 28 engages the first plug 22a provided on the shifter housing 22. Thus, the biasing member 28 reacts between the first plug 22a and the left end of the shifter piston 24 to urge the shifter piston 24 and the shift fork 21 for movement in the first direction (toward the right in FIG. 2). When the shifter piston 24 and the shift fork 21 are moved to a first position, the clutch of the power take-off 10 is disengaged.

An elongated step bore 24b is provided within the shifter piston 24 that extends between the counterbore 24a and a bleed orifice 24c that is provided in the end of the shifter piston 24 opposite the counterbore 24a. The purposes for the elongated step bore 24b and the bleed orifice 24c will be explained below. The elongated step bore 24b is illustrated as having a diameter that is smaller than the diameter of the counterbore 24a, although such is not required. The smaller diameter of the counterbore 24a provides an internal shoulder against which the biasing member 28 may react, as described above.

The bleed orifice 24c provides controlled and metered fluid communication between the interior of the shifter piston 24 and the first chamber 25 defined within the shifter housing 22. A laterally extending passageway 30 is formed in the shifter piston 24 and provides fluid communication between the elongated step bore 24b and an annular channel 31 that is provided in the outer surface of the shifter piston 24. In the illustrated embodiment, the channel 31 extends completely about the outer surface of the shifter piston 24. However, such is not required, and the channel 31 may have any desired shape. In the illustrated embodiment, the channel 31 is located within the annular portion 21a of the shift fork 21.

Figure 2:
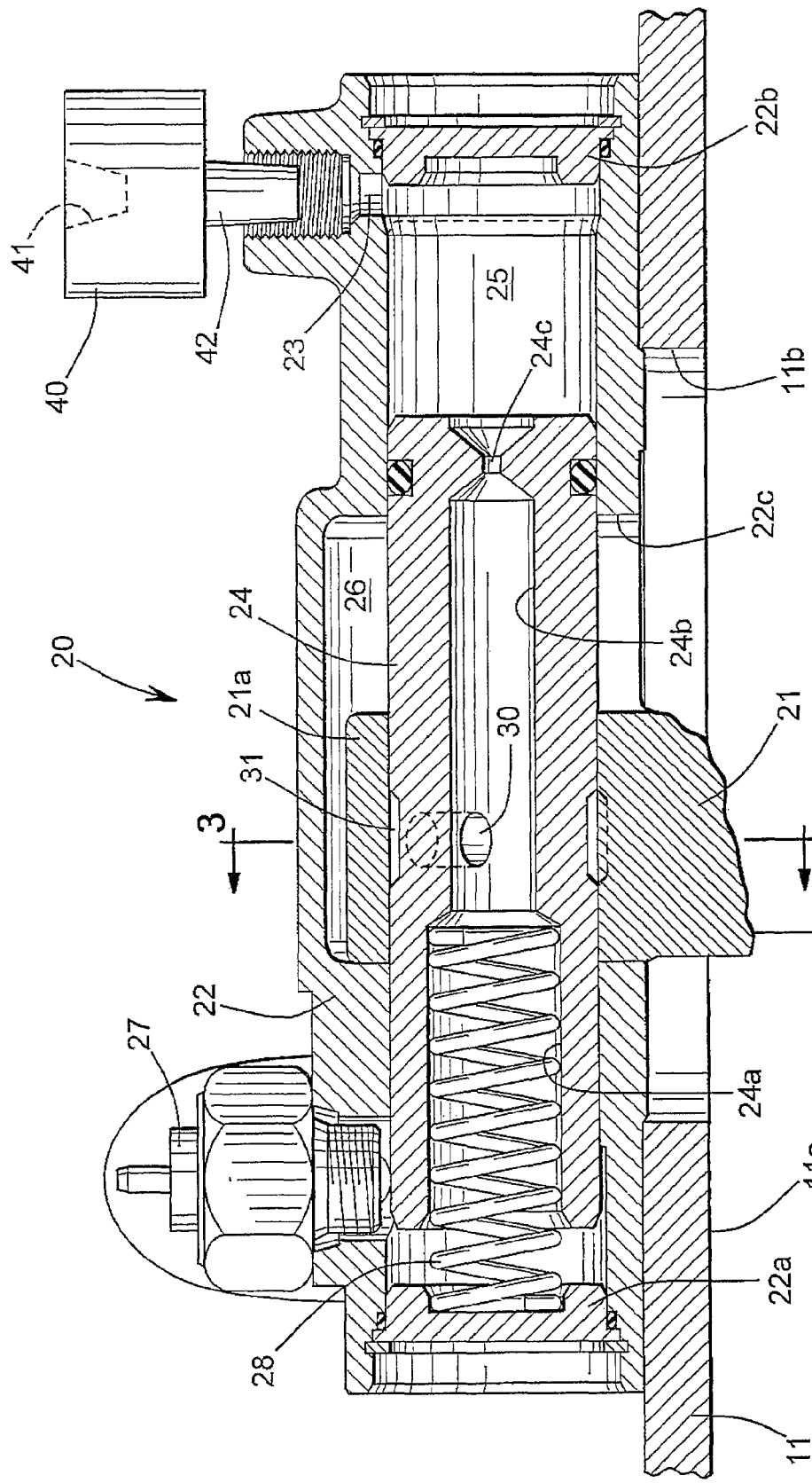
FIG. 2 is an enlarged sectional elevational view of the first embodiment of the hydraulically operated shifter taken along line 2-2 of FIG. 1.

Alternatively, the channel 31 may be formed in the inner surface of the annular portion 21a of the shift fork 21, as opposed to the outer surface of the shifter piston 24, as shown in dotted lines in FIG. 2. In either event, an exhaust passageway 32 (see FIG. 3) is formed through the annular portion 21a of the shift fork 21 and provides fluid communication between the channel 31 and the second chamber 26 defined within the shifter housing 22. The purposes for the channel 31 and the exhaust passageway 32 will be explained below.

The shifter 20 further includes a fluid control valve 40 having an inlet port 41 and an outlet port 42. The fluid control valve 40 may be embodied as a solenoid valve or any other conventional structure that can operated to selectively control the flow of fluid therethrough from the inlet port 41 to the outlet port 42. The inlet port 41 of the fluid control valve 40 communicates with a source of pressurized fluid (not shown) by means of any conventional conduit, such as flexible hoses, rigid tubing, and the like. The outlet port 42 of the fluid control valve 40 communicates with the first chamber 25 defined within the shifter housing 22. Thus, the fluid control valve 40 can be operated to selectively permit and prevent pressurized fluid from flowing therethrough from the source of pressurized fluid to the first chamber 25 defined within the shifter housing 21.

When the fluid control valve 40 is operated to permit the pressurized fluid to flow into the first chamber 25, such pressurized fluid exerts a force against the right end of the shifter piston 24. When the amount of force exerted against the right end of the shifter piston 24 exceeds the amount of force exerted against the left end of the shifter piston 24 by the biasing member 28, the shifter piston 24 and the shift fork 21 will be moved in the second direction (toward the left in FIG. 2) to a second position. As a result, the clutch of the power take-off 10 will be engaged, as described above.

During the time when the pressurized fluid in the first chamber 25 bears against the right end of the shifter piston 24, a relatively small and metered volume of such fluid is allowed to pass through the bleed orifice 24c into the elongated step bore 24b provided within the interior of the shifter piston 24. Such fluid passes from the elongated step bore 24b through the laterally extending channel 30, the annular channel 31 provided in the outer surface of the shifter piston 24, and the exhaust passageway 32 formed through the annular portion 21a of the shift fork 21 into the second chamber 26 defined within the shifter housing 22. From there, such fluid drains through the opening 22c formed through the shifter housing 22 and through the opening 11b formed through the power take-off housing 11 into the interior of the power take-off 10. The interior of the power take-off 10 may itself communicate with the interior of the transmission or other mechanism upon which it is mounted to allow the fluid to return to the point of origin, which typically is a reservoir for the source of pressurized fluid.

In order to disengage the clutch of the power take-off 10, the fluid control valve 40 is actuated to prevent fluid communication between the inlet port 41 and the outlet port 42 thereof. As a result, the source of pressurized fluid is prevented from communicating with the first chamber 25 defined within the shifter housing 22. Because the bleed orifice 24c continues to allow fluid to flow from the first chamber 25 into the interior of the shifter piston 24, the force continues to be exerted by the biasing member 28 against the left end of the shifter piston 24 to move the shifter piston 24 and the shift fork 21 in the first direction (toward the right in FIG. 2) to disengage the clutch of the power take-off 10. As the shifter piston 24 moves toward the right under the urging of the biasing member 28, the fluid in the first chamber 25 continues to flow through the bleed orifice 24c and back to the reservoir for the source of pressurized fluid as described above.

The size of the bleed orifice 24c is preferably selected to be sufficiently small such that when pressurized fluid is provided within the first chamber 25 defined within the shifter housing 22 as described above, the amount of force that is exerted against the right end of the shifter piston 24 by the pressurized fluid can quickly exceed the amount of force that is exerted against the left end of the shifter piston 24 by the biasing member 28. This allows the shifter piston 24 and the shift fork 21 to be quickly moved in the second direction, causing the clutch of the power take-off 10 to be engaged in a relatively short period of time. At the same time, however, the size of the bleed orifice 24c is preferably selected to be sufficiently large such that when pressurized fluid is no longer provided within the first chamber 25 as described above, the fluid remaining in the first chamber 25 can quickly bleed out of the interior of shifter piston 24 and the shifter housing 22. This allows the biasing member 28 to quickly move the shifter piston 24 and the shift fork 21 in the first direction, causing the clutch of the power take-off 10 to be disengaged. The specific size of the bleed orifice 24c can be determined by several factors. Some of these factors include the spring rate of the resilient member 28, the magnitude of the pressurized fluid supplied to the first chamber 25, the flow rate of the pressurized fluid provided from the source of pressurized fluid to the first chamber 25, the operating temperature of the shifter 20, the type of fluid used (including fluid properties such as fluid shear characteristics, viscosity, and compressibility), and other factors.

Thus, it can be seen that this invention provides a constant and metered flow of fluid from the source of pressurized fluid back to the reservoir for such source. This eliminates the need for a separate liquid return line to be provided between the fluid control valve 40 and the reservoir of the fluid, as described above in connection with known hydraulically operated shifters. It also simplifies the structure of the fluid control valve 40 because no exhaust port is needed. As a result, the cost and complexity of the system is reduced.

Figure 4:
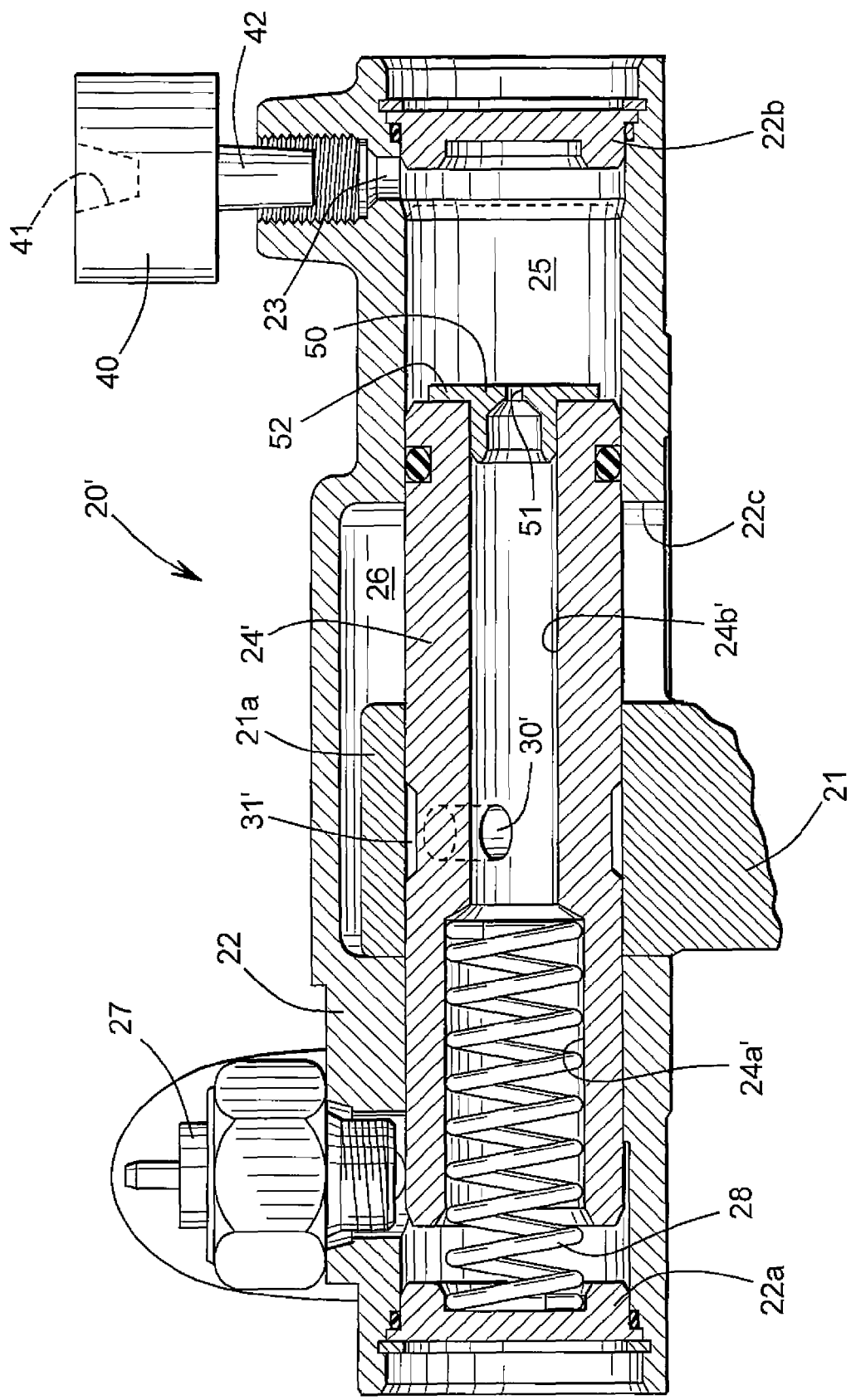
FIG. 4 is an enlarged sectional elevational view similar to FIG. 2 of a second embodiment of the hydraulically operated shifter of FIG. 1.

FIG. 4 illustrates a second embodiment of a hydraulically operated shifter, indicated generally at 20', that can be used with the power take-off 10 shown in FIG. 1. The second embodiment of the hydraulically operated shifter 20' is, in large measure, similar in structure and operation to the first embodiment of the hydraulically operated shifter 20 described above, and like reference numbers are used to indicate similar structures. In this second embodiment of the hydraulically operated shifter 20', however, a modified shifter piston 24' has a counterbore 24a' and an elongated step bore 24b' provided therein, but no bleed orifice 24c formed through the right end thereof. Rather, the elongated step bore 24b' extends completely through to the right end of the modified shifter piston 24'. A metering plug 50 is disposed the end of the elongated step bore 24b'. The metering plug 50 may be retained within the elongated step bore 24b' in any conventional manner, such as by a press or interference fit or by a threaded engagement. The metering plug 50 has a bleed orifice 51 formed therethrough that functions in the same manner as the bleed orifice 24c described above. The metering plug 50 may include a flange 52 that seats against the right end of the modified shifter piston 24', although such is not required. The metering plug 50 allow the size of the bleed orifice 51 to be quickly and easily varied without requiring the replacement of the entire modified shifter piston 24'.

Figure 5:
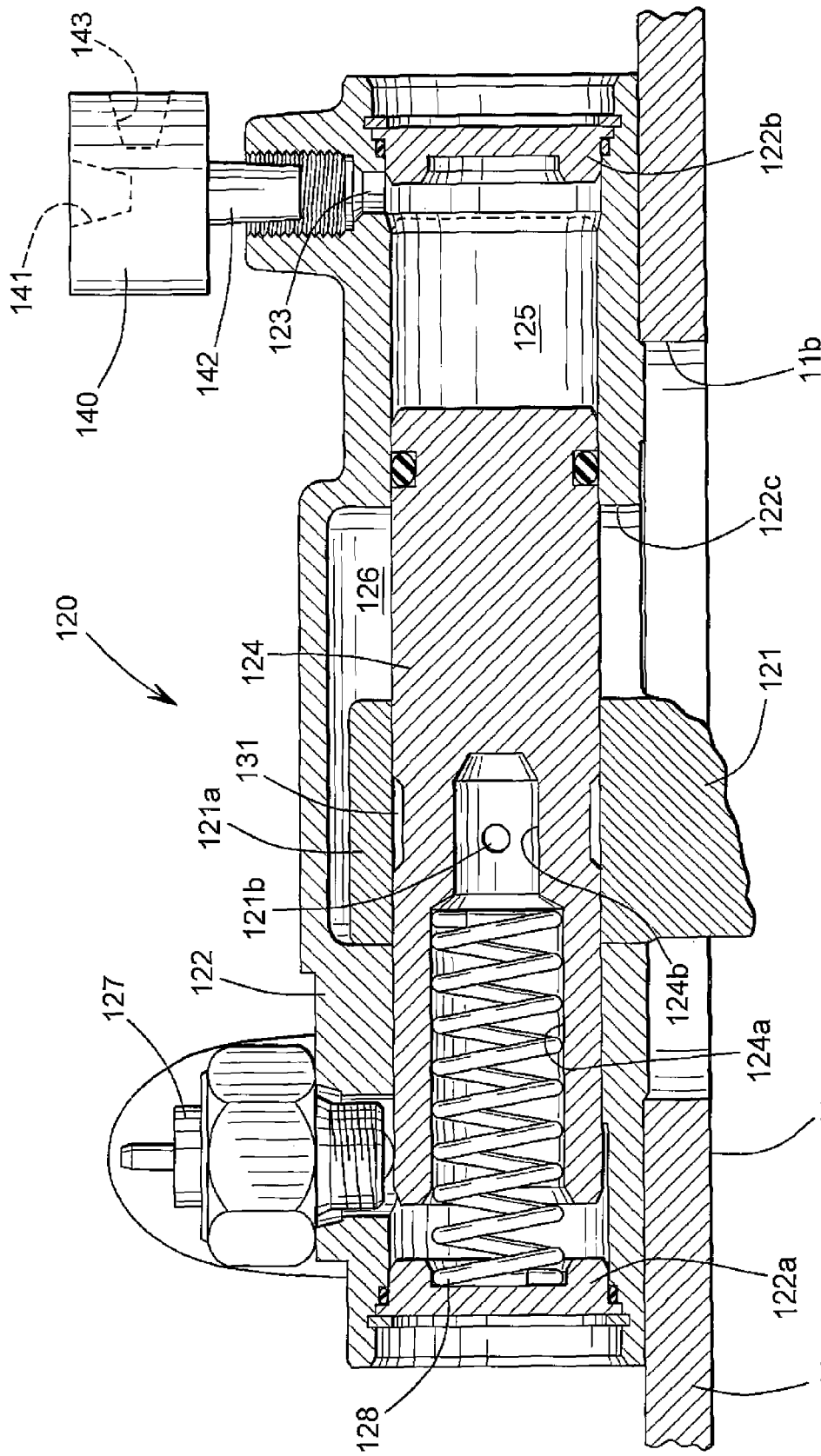
FIG. 5 is an enlarged sectional elevational view similar to FIG. 2 of a prior art hydraulically operated shifter for a power take-off unit.

FIG. 5 illustrates a prior art embodiment of a hydraulically operated shifter, indicated generally at 120. The prior art embodiment of the hydraulically operated shifter 120 is somewhat similar in structure and operation to the first embodiment of the hydraulically operated shifter 20 described above, and like reference numbers are used to indicate similar structures. The prior art shifter 120 includes an axially movable shift fork 121 or other shift actuator that is similar to the shift fork 21 described above. The prior art shifter 120 further includes a shifter housing 122 that is generally hollow and cylindrical in shape. The shifter housing 122 can be mounted on the power take-off housing 11 and includes a fluid port 123 that communicates with the interior of the shifter housing 122. The opposed ends of the shifter housing 122 may be sealed by first and second plugs 122a and 122b. An opening 22c is formed through a portion of the shifter housing 122 and is aligned with the opening 11b formed through the housing 11 of the power take-off 10. The shift fork 121 extends through the opening 122c formed through the shifter housing 122 and through the opening 11b formed through the power take-off housing 11 into engagement with a clutch provided within the power take-off housing 11.

A shifter piston 124 is disposed within the shifter housing 122 for sliding movement in first and second directions. A portion of the shifter piston 24 (near the right end when viewing FIG. 5) seals against a portion of the inner surface of the shifter housing 122 so as to divide the interior of the shifter housing 122 into a first chamber 125 and a second chamber 126. The fluid port 123 provided through the shifter housing 122 communicates with the first chamber 125. The second chamber 126 communicates through the opening 122c formed through the shifter housing 122 and through the opening 11b formed through the power take-off housing 11 with the interior of the power take-off housing 11. A sensor 27 or other device may be mounted on the shifter housing 122 to monitor one or more characteristics of the operation of the shifter 120.

The shift fork 121 is supported on the shifter piston 124 for movement therewith in both the first and second directions. To accomplish this, the shift fork 121 includes an annular portion 121a that extends about a portion of the outer surface of the shifter piston 124. The shift fork 121 is secured for concurrent movement with the shifter piston 124 by means of a threaded fastener 121b. Thus, when the shifter piston 124 and the shift fork 121 are moved in the first direction (toward the right in FIG. 5), the clutch is disengaged such that the output shaft 13 is not connected for rotation by the input gear 12 and, therefore, operation of the rotatably driven accessory is prevented. When the shifter piston 124 and the shift fork 121 are moved in the second direction, the clutch is engaged such that the output shaft 13 is connected for rotation by the input gear 12 and, therefore, operation of the rotatably driven accessory is permitted.

The shifter piston 124 has a counterbore 124a provided therein that receives a first end of a biasing member 128. A second end of the biasing member 128 engages the first plug 122a provided on the shifter housing 122. Thus, the biasing member 128 reacts between the first plug 122a and the left end of the shifter piston 124 to urge the shifter piston 124 and the shift fork 121 for movement in the first direction (toward the right in FIG. 5). When the shifter piston 124 and the shift fork 121 are moved to a first position, the clutch of the power take-off 10 is disengaged.

A step bore 124b is provided within the shifter piston 24 that extends from the counterbore 124a. The step bore 124b has a diameter that is smaller than the diameter of the counterbore 124a and provides an internal shoulder against which the biasing member 128 may react. An annular channel 131 is provided in the outer surface of the shifter piston 124. The channel 131 is located within the annular portion 121a of the shift fork 121. The shifter 120 further includes a fluid control valve 140 having an inlet port 141, an outlet port 142, and an exhaust port 143. The inlet port 141 of the fluid control valve 140 communicates with a source of pressurized fluid (not shown). The outlet port 142 of the fluid control valve 140 communicates with the first chamber 125 defined within the shifter housing 122. The exhaust port 143 of the fluid control valve 140 communicates with a reservoir for the source of pressurized fluid.

When the fluid control valve 140 is operated to permit the pressurized fluid to flow into the first chamber 125, such pressurized fluid exerts a force against the right end of the shifter piston 124. When the amount of force exerted against the right end of the shifter piston 124 exceeds the amount of force exerted against the left end of the shifter piston 124 by the biasing member 28, the shifter piston 124 and the shift fork 121 will be moved in the second direction (toward the left in FIG. 5) to a second position. As a result, the clutch of the power take-off 10 will be engaged, as described above.

In order to disengage the clutch of the power take-off 10, the fluid control valve 140 is actuated to prevent fluid communication between the inlet port 141 and the outlet port 142 thereof. As a result, the source of pressurized fluid is prevented from communicating with the first chamber 125 defined within the shifter housing 122. At the same time, the fluid control valve 140 is actuated to permit fluid communication between the outlet port 142 and the exhaust port 143 thereof. As a result, the first chamber 125 defined within the shifter housing 122 is vented through the exhaust port 143 to the reservoir for the source of pressurized fluid. As the shifter piston 124 moves toward the right under the urging of the biasing member 128, the fluid in the first chamber 125 continues to flow through the exhaust port 143 to the reservoir for the source of pressurized fluid.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A shifter that is adapted for use with a clutch comprising:
a shifter housing including an interior, a fluid port, and an opening;
a shifter piston disposed within the interior of the shifter housing and axially movable in first and second directions, the shifter piston defining first and second chambers within the interior of the shifter housing, the fluid port communicating with the first chamber and the opening communicating with the second chamber, the shifter piston including an axially-extending orifice that provides constant fluid communication between the first and second chambers defined within the interior of the shifter housing; and
a shift actuator that is supported on the shifter piston for movement therewith and extends through the opening provided in the shifter housing, the shift actuator being adapted for use with a clutch.

2. The shifter defined in claim 1 wherein the shifter piston includes a bore, and wherein the orifice provides communication between the first chamber defined within the interior of the shifter housing and the bore.

3. The shifter defined in claim 2 wherein the shifter piston further includes a passageway that provides communication between the bore and a channel provided in an outer surface of the shifter piston.

4. The shifter defined in claim 3 wherein the channel is provided in an inner surface of a portion of a shift fork that is disposed about the shifter piston.

5. The shifter defined in claim 4 wherein the shift fork includes an exhaust passageway that provides communication between the channel and the second chamber defined within the interior of the shifter housing.

6. The shifter defined in claim 1 wherein the orifice is formed in the shifter piston.

7. The shifter defined in claim 1 wherein the orifice is formed in a metering plug that is supported on the shifter piston.

8. The shifter defined in claim 1 further including a biasing structure for urging the shifter piston to move in a first direction.

9. The shifter defined in claim 8 further including a source of pressurized fluid that selectively communicates with the first chamber defined within the shifter housing for urging the shifter piston to move in a second direction that is opposite to the first direction.

10. A power take-off assembly comprising:
a power take-off having an input gear, an output shaft, and a clutch for selectively connecting the output shaft for rotation by the input gear; and
a shifter for operating the clutch, the shifter including:
a shifter housing including an interior, a fluid port, and an opening;
a shifter piston disposed within the interior of the shifter housing and axially movable in first and second directions, the shifter piston defining first and second chambers within the interior of the shifter housing, the fluid port communicating with the first chamber and the opening communicating with the second chamber, the shifter piston including an axially-extending orifice that provides constant fluid communication between the first and second chambers defined within the interior of the shifter housing; and
a shift actuator that is supported on the shifter piston for movement therewith and extends through the opening provided in the shifter housing, the shift actuator being connected for operating the clutch.

11. The power take-off assembly defined in claim 10 wherein the shifter piston includes a bore, and wherein the orifice provides communication between the first chamber defined within the interior of the shifter housing and the bore.

12. The power take-off assembly defined in claim 11 wherein the shifter piston further includes a passageway that provides communication between the bore and a channel provided in an outer surface of the shifter piston.

13. The power take-off assembly defined in claim 12 wherein the channel is provided in an inner surface of a portion of a shift fork that is disposed about the shifter piston.

14. The power take-off assembly defined in claim 13 wherein the shift fork includes an exhaust passageway that provides communication between the channel and the second chamber defined within the interior of the shifter housing.

15. The power take-off assembly defined in claim 10 wherein the orifice is formed in the shifter piston.

16. The power take-off assembly defined in claim 10 wherein the orifice is formed in a metering plug that is supported on the shifter piston.

17. The power take-off assembly defined in claim 10 further including a biasing structure for urging the shifter piston to move in a first direction.

18. The power take-off assembly defined in claim 17 further including a source of pressurized fluid that selectively communicates with the first chamber defined within the shifter housing for urging the shifter piston to move in a second direction that is opposite to the first direction.

19. A shifter that is adapted for use with a clutch comprising:
- a shifter housing including an interior, a fluid port, and an opening;
- a shifter piston disposed within the interior of the shifter housing and movable in first and second directions, the shifter piston defining first and second chambers within the interior of the shifter housing, the first and second chambers defining respective volumes that vary with movement of the shifter piston within the interior of the shifter housing, the fluid port communicating with the first chamber and the opening communicating with the second chamber, the shifter piston including an orifice that provides constant fluid communication between the first and second chambers defined within the interior of the shifter housing; and
- a shift actuator that is supported on the shifter piston for movement therewith and extends through the opening provided in the shifter housing, the shift actuator being adapted for use with a clutch.

* * * * *